(12) United States Patent
Onuki et al.

(10) Patent No.: US 6,901,966 B2
(45) Date of Patent: Jun. 7, 2005

(54) SEAL DEVICE FOR TUBULAR MEMBER

(75) Inventors: Giichi Onuki, Kanagawa (JP); Hirohito Nishimura, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/733,637

(22) Filed: Dec. 12, 2003

(65) Prior Publication Data

US 2004/0124589 A1 Jul. 1, 2004

(30) Foreign Application Priority Data

Dec. 13, 2002 (JP) ........................................ 2002-362664
Nov. 17, 2003 (JP) ........................................ 2003-386149

(51) Int. Cl.[7] .............................................. F16L 55/12
(52) U.S. Cl. ........................ 138/93; 138/97; 138/90; 138/94
(58) Field of Search ............................ 138/93, 89, 98, 138/97, 94, 90

(56) References Cited

U.S. PATENT DOCUMENTS

| | | | | | |
|---|---|---|---|---|---|
| 1,506,418 | A | * | 8/1924 | Evensta et al. ................ | 138/90 |
| 2,299,116 | A | * | 10/1942 | Bennett ........................ | 138/90 |
| 3,080,269 | A | * | 3/1963 | Walter et al. .................. | 156/87 |
| 3,091,259 | A | * | 5/1963 | Alessio ........................ | 138/90 |
| 3,103,235 | A | * | 9/1963 | Stringham, III .............. | 138/97 |
| 3,182,725 | A | * | 5/1965 | Moore ......................... | 166/66.4 |
| 3,269,421 | A | * | 8/1966 | Telford et al. ................. | 138/97 |
| 3,564,103 | A | * | 2/1971 | Brachschob et al. .......... | 373/82 |
| 3,618,639 | A | * | 11/1971 | Daley et al. ................... | 138/97 |
| 3,834,422 | A | * | 9/1974 | Larson ......................... | 138/97 |
| 3,870,085 | A | * | 3/1975 | Schneider .................... | 138/93 |
| 3,902,528 | A | * | 9/1975 | Tartabini et al. .............. | 138/90 |
| 4,067,349 | A | * | 1/1978 | Austin et al. .................. | 38/97 |
| 4,354,515 | A | * | 10/1982 | Sutherland ............. | 134/167 C |
| 4,449,584 | A | * | 5/1984 | Christensen ................ | 166/187 |
| 4,783,108 | A | | 11/1988 | Fukuyama et al. ........ | 294/98.1 |
| 5,353,842 | A | * | 10/1994 | Lundman ..................... | 138/93 |
| 5,901,752 | A | * | 5/1999 | Lundman ..................... | 138/93 |
| 6,516,832 | B1 | * | 2/2003 | Myers ......................... | 138/93 |

FOREIGN PATENT DOCUMENTS

JP  7-29266 B2  4/1995

* cited by examiner

*Primary Examiner*—Patrick Brinson
(74) *Attorney, Agent, or Firm*—Sughrue Mion, PLLC (57) ABSTRACT

A seal device is constituted of a plurality of seal tubes. After a connected-tube body having base members disposed at a fore end and a rear end is inserted into a fluid passage such as a tubular member, the seal tubes are expanded by injecting gaseous nitrogen into each of the seal tubes. The intermediate portions of the seal tubes along a longitudinal direction are press-fitted to the inner surface of the fluid passage over the entire circumference thereof, whereby the fluid passage is sealed. Since the connected-tube body is easily bent in the vicinity of a connecting base member between the tubes, the connected-tube body can be easily curved along the fluid passage, thus facilitating an operation for inserting the connected-tube body into the fluid passage and also enhancing a sealing property with respect to the fluid passage.

15 Claims, 10 Drawing Sheets

SEAL DEVICE FOR TUBULAR MEMBER

CROSS-REFERENCE TO RELATED APPLICATIONS

This application claims priority under 35 USC 119 from Japanese Patent Applications No. 2002-362664 and No. 2003-386149, the disclosures of which are incorporated by reference herein.

BACKGROUND OF THE INVENTION

1. Field of the Invention

The present invention relates to a seal device for a tubular member or the like, for sealing a passage such as a tubular member at an inlet or an outlet in various containers or equipment by the use of an expanded tube.

2. Description of the Related Art

A device for gripping a bottle or the like, wherein a conventional rubber tube is expanded by injecting a fluid such as air into the tube, thereby sealing a mouth of the bottle or the like, is known. One example of such a device is disclosed on pages 4 to 5 and FIG. 1 of Japanese Patent Application Publication (JP-B) No. 7-29266. In the conventional device, both ends of a tube, into which a fluid can be injected, are respectively fixed at both ends of a single cylindrical base member. One end of the tube is fixed to a fore end of the base member, and then, the tube is folded back over itself at the fore end of the base member. In this device, the folded portion of the tube is inserted into a hole of a part, the tube is press-fitted to the inner circumferential surface of the hole by expansion, and thus, the part is gripped. If the hole of the part is a hole of a mouth of a bottle or a flask, the bottle or the like can be gripped and the mouth can be sealed.

In the conventional structure, the fore end of the base member is fitted to one end of the tube, and then, the outer periphery of the fore end of the base member is securely clamped around the tube by a clamping ring. Thereafter, the tube is folded inward (back over itself), the tube is pulled up to a base end of the base member in such a manner that the base member is covered with the other end of the tube, the other end of the tube is securely damped at the base end of the base member by a clamping ring, and thus, the folded portion of the tube is located at the fore end. The folded portion is inserted into a passage such as a tubular member or a hole formed at a part. However, in the case where the passage or the hole is curved, if the curvature is large, the tube cannot be inserted since the base member is rigid and has a predetermined length. Moreover, although it is advantageous to use a long tube or a plurality of tubes connected to each other for a passage such as a tubular member at an inlet or an outlet, in the case where the pressure inside of the container or equipment is high, it is difficult to fabricate an elongated tube having a conventional tube folding structure, and further, the folded portion makes a diameter large. Additionally, the base member also must be elongated, thereby resulting in an increase in weight, and the base member cannot be used in the case where the passage is curved.

SUMMARY OF THE INVENTION

In view of the above-described problems observed in the prior art, an object of the present invention is to provide a seal device for a tubular member or the like, by which a portion to be sealed can be sufficiently sealed even under a high pressure, and which can be used even in a curved passage, is light in weight, and can be easily handled.

In order to achieve the above-described object, a first aspect of the invention is to provide a seal device for a tubular member provided with a single cylindrical seal tube to be inserted into a passage such as a tubular member, in which the seal tube is expanded toward an outer periphery by injecting a fluid into the seal tube, for use in sealing an inside of the passage such as a tubular member, the seal device for a tubular member comprising: the seal tube having openings at a fore end and a rear end thereof; first and second base members to be inserted to the fore end and the rear end of the seal tube, so as to tightly seal an inside of the seal tube; a fluid injection passage disposed in such a manner as to communicate with the inside of the seal tube through the second base member; a discharge pipe inserted through the seal tube and communicating with an outside of the seal tube through the first and second base members; and a switch valve for opening and closing the discharge pipe.

In the seal device for a tubular member or the like according to the above-described aspect, the seal tube can be expanded toward the outer periphery by injecting the fluid into the seal tube through the fluid injection passage disposed in such a manner as to communicate with the inside of the seal tube through the second base member. Consequently, if the seal tube is inserted into the fluid passage such as a tubular member from a side of the first base member and the fluid is injected into the seal tube from the outside of a fluid passage such as a tubular member through the fluid injection passage, the inside of the fluid passage such as a tubular member can be sealed by the expanded seal tube.

Furthermore, since the fluid pressure inside of the fluid passage such as a tubular member sealed by the seal tube can be released to the outside through the discharge pipe if the discharge pipe is released via the switch valve in a state in which the seal tube is inserted into the inside of the fluid passage such as a tubular member, an increase in pressure inside of the fluid passage such as a tubular member can be suppressed, as required, while the fluid passage such as a tubular member is sealed by the seal tube.

A second aspect of the invention is to provide a seal device for a tubular member provided with a plurality of cylindrical seal tubes to be inserted into a passage such as a tubular member, in which the seal tubes are expanded toward an outer periphery by injecting a fluid into the seal tubes, for use in sealing an inside of the passage such as a tubular member, the seal device for a tubular member comprising: the plurality of seal tubes, which can be elastically expanded toward the outer periphery, having openings at fore ends and rear ends thereof; at least one connecting base member, by which a fore end of one of the seal tubes is connected to a rear end of another of the seal tubes, so as to configure a connected-tube body; at least one communication path formed at the at least one connecting base member and allowing the plurality of seal tubes constituting the connected-tube body to communicate with each other; first and second base members inserted to a fore end and a rear end of the connected-tube body, so as to tightly seal an inside of the connected-tube body; and a fluid injection passage disposed in such a manner as to communicate with insides of the plurality of seal tubes constituting the connected-tube body, through the second base member.

In the seal device for a tubular member or the like according to the above-described second aspect, the plurality of seal tubes can be expanded toward the outer periphery by injecting the fluid into the plurality of seal tubes constituting the connected-tube body through the fluid injection passage. Consequently, if the connected-tube body is inserted into the fluid passage such as a tubular member from the side of the first base member and then the fluid is injected into the plurality of seal tubes from the outside of the fluid passage such as a tubular member through the fluid injection passage, the inside of the fluid passage such as a tubular member can be sealed by the plurality of expanded seal tubes (i.e., the connected-tube body).

At this time, since the vicinity of the center of each of the plurality of seal tubes constituting the connected-tube body is press-fitted to the inner surface of the fluid passage such as a tubular member at a maximum pressure corresponding to an inner pressure, press-fitting force acting on the inner surface of the fluid passage such as a tubular member can be increased by the connected-tube body as a whole, and further, an area of a portion press-fitted to the inner surface of the fluid passage such as a tubular member at the maximum pressure can be increased in comparison with the case where only one seal tube is expanded inside of the fluid passage such as a tubular member so as to seal the inside of the fluid passage such as a tubular member. Consequently, it is possible to seal the inside of the fluid passage such as a tubular member against a high pressure, and further, to enhance a sealing property with respect to the fluid passage such as a tubular member.

Moreover, even if the fluid passage such as a tubular member is curved or bent, the connected-tube body can be easily curved or bent along the fluid passage such as a tubular member. Therefore, the plurality of seal tubes can be readily inserted into the curved or bent fluid passage such as a tubular member and a sealing property with respect to the curved or bent fluid passage such as a tubular member can be enhanced.

A third aspect of the invention provides a seal device for a tubular member provided with a plurality of cylindrical seal tubes to be inserted into a passage such as a tubular member, in which each of the seal tubes is expanded toward an outer periphery by injecting a fluid into each of the seal tubes, for use in sealing an inside of the passage such as a tubular member, the seal device for the tubular member comprising: the plurality of seal tubes, which can be elastically expanded toward the outer periphery, having openings at fore ends and rear ends thereof; at least one connecting base member, by which a fore end of one of the seal tubes is connected to a rear end of another of the seal tubes, so as to configure a connected-tube body, the at least one connecting base member dividing the connected seal tubes such that each of the seal tubes is in a tightly sealed stated; first and second base members inserted to a fore end and a rear end of the connected-tube body, so as to tightly seal tubes respectively constituting the fore end and the rear end of the connected-tube body; and a plurality of fluid injection passages disposed in such a manner as to communicate independently with insides of the plurality of seal tubes constituting the connected-tube body, through the second base member and the at least one connecting base member.

In the seal device for a tubular member or the like according to the above-described third aspect, one or more seal tubes selected from the plurality of seal tubes can be expanded toward the outer periphery by injecting the fluid into the one or more seal tubes selected from the plurality of seal tubes constituting the connected-tube body through one or more fluid injection passages selected from the plurality of fluid injection passages. Consequently, if the connected-tube body is inserted into the fluid passage such as a tubular member from the side of the first base member and the fluid is injected into one or more seal tubes selected from the plurality of seal tubes from the outside of the fluid passage such as a tubular member through the one or more of the fluid injection passages, the inside of the fluid passage such as a tubular member can be sealed at one or more portions selected from a plurality of portions respectively corresponding to the plurality of seal tubes, inside of the fluid passage such as a tubular member.

At this time, since the vicinity of the center of each of the plurality of seal tubes is press-fitted to the inner surface of the fluid passage such as a tubular member at a maximum pressure corresponding to an inner pressure if the plurality of seal tubes are simultaneously expanded inside of the fluid passage such as a tubular member, press-fitting force acting on the inner surface of the fluid passage such as a tubular member can be increased by the connected-tube body as a whole, and further, an area of a portion press-fitted to the inner surface of the fluid passage such as a tubular member at the maximum pressure can be increased in comparison with the case where only one seal tube is expanded inside of the fluid passage such as a tubular member so as to seal the inside of the fluid passage such as a tubular member. Consequently, it is possible to seal the inside of the fluid passage such as a tubular member against a high pressure, and further, to enhance a sealing property with respect to the fluid passage such as a tubular member.

Moreover, even if the fluid passage such as a tubular member is curved or bent, the connected-tube body can be easily curved or bent along the fluid passage such as a tubular member. Therefore, the seal tube can be readily inserted into the curved or bent fluid passage such as a tubular member and a sealing property with respect to the curved or bent fluid passage of the tubular member can be enhanced.

Furthermore, in the seal device for a tubular member or the like according to the second and third aspects, there may be provided a discharge pipe to be inserted through the connected-tube body and communicating with the outside of the connected-tube body through the first and second base members; and a switch valve for opening and closing the discharge pipe.

Moreover, in the seal device for a tubular member or the like according to any one of the above-described aspects, the seal tube may include a cylindrical rubber sleeve layer, and a cylindrical rubber cover layer laminated on an outer periphery of the rubber sleeve layer and covering the outer periphery of the rubber sleeve layer.

Additionally, in the seal device for a tubular member or the like according to any one of the above-described aspects, the first base member may have a guide, which is formed into a tapered shape projecting from a tip of the seal tube and gradually increasing in outer diameter from a tip portion of the guide toward the base end portion of the guide on a seal tube side thereof. With this configuration, the guide can be replaced with another guide having a maximum outer diameter according to (corresponding to) the inner diameter of the fluid passage such as a tubular member.

In addition, in the seal device for a tubular member or the like according to any one of the above-described aspects, there may be a pulling member being detachably connected to the second base member and extending outside of the fluid passage in the state in which the seal tube or the connected-tube body is inserted into the fluid passage such as a tubular member. The seal tube or the connected-tube body can be pulled out from the fluid passage such as a tubular member with the application of pulling force to the pulling member.

Furthermore, in the seal device for a tubular member or the like according to any one of the above-described aspects, gaseous nitrogen can be used as the fluid to be injected into the seal tube.

As described above, by using the seal device for a tubular member or the like according to the invention, secure sealing can be achieved even if the inside pressure of the fluid passage such as a tubular member, at a portion to be sealed, is high, and further, the workability in inserting the seal tube into the fluid passage is excellent with secure sealing even if the fluid passage is curved.

DETAILED DESCRIPTION OF THE INVENTION

Embodiments of the present invention will be described below in reference to the accompanying drawings.
(First Embodiment)

Figure 1:
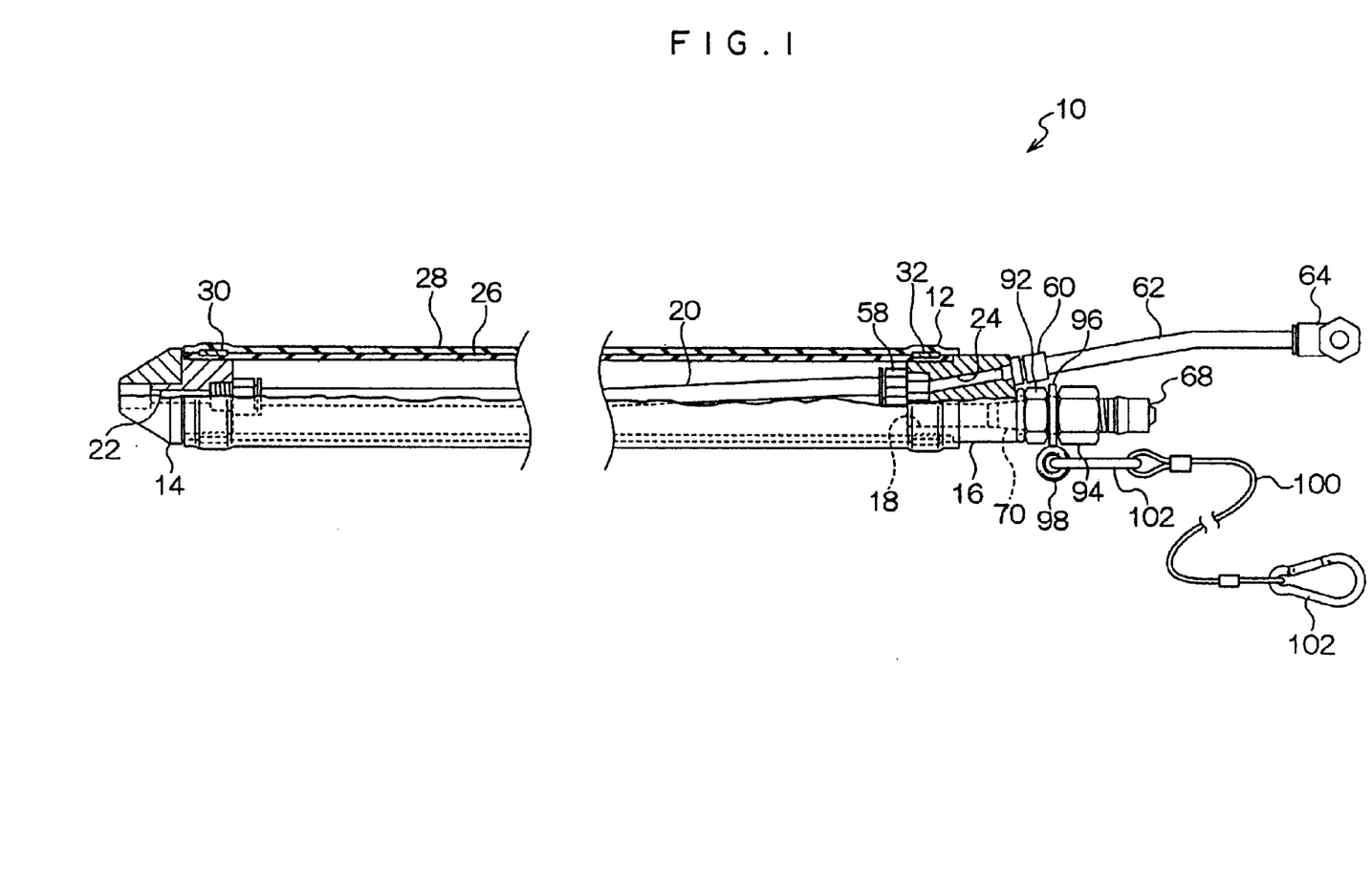
FIG. 1 is a side cross-sectional view showing the configuration of a seal device for a tubular member or the like in a first embodiment of the present invention.

FIG. 1 shows a seal device for a tubular member or the like (hereinafter simply referred to as "a seal device") in a first embodiment of the invention. A seal device 10 is formed into a relatively long and cylindrical shape, and is provided with a cylindrical seal tube 12 opened at both ends thereof (i.e., a fore end and a rear end) along a longitudinal direction. At the fore end of the seal tube 12 is securely inserted a base member 14; in contrast, at the rear end of the seal tube 12 is securely inserted another base member 16. Consequently, both ends of the seal tube 12 are dosed by the base members 14 and 16, so that the inside of the seal tube 12 is turned into a tightly sealed state. At the base member 16, a fluid injection passage 18 is formed in such a manner as to penetrate along the longitudinal direction of the seal tube 12. The fluid injection passage 18 is adapted to inject a fluid such as gaseous nitrogen into the seal tube 12, so as to expand the seal tube 12 toward the outer periphery.

The seal tube 12 has flexibility at a portion between two base members 14 and 16, and thus, can be elastically expanded toward the outer periphery according to an increase in inner pressure. Into the seal tube 12 is inserted a discharge pipe 20 whose both ends communicate with the outside of the seal tube 12 via through holes 22 and 24 bored at the base members 14 and 16, respectively. The discharge pipe 20 is made of, for example, polyurethane, and therefore, has flexibility. Consequently, the discharge pipe 20 is flexibly deformed according to the flexible deformation of the seal tube 12.

The seal tube 12 is configured in a double layer: a cylindrical rubber sleeve layer 26 forming the inner circumferential portion thereof, and a cylindrical rubber cover layer 28 laminated on the outer periphery of the rubber sleeve layer 26 and covering the outer periphery of the rubber sleeve layer 26. Each of the rubber sleeve layer 26 and the rubber cover layer 28 is molded of a rubber material such as chloroprene rubber. Inside of the rubber sleeve layer 26 is embedded reinforcing fiber braided in a bias or radial manner. In this manner, since the seal tube 12 is configured in the double layer, even if a damage such as a scratch or a crack occurs at the surface of the seal tube 12 (the rubber cover layer 28) when the seal tube 12 is inserted into a fluid passage such as a tubular member, it is possible to prevent any growth of such a damage at the inner surface of the seal tube 12 (the rubber sleeve layer 26) caused by a stress or the like at the time of the insertion, so as to prevent any leakage of gas from the seal tube 12 caused by the damage occurring on the surface of the seal tube 12 for a long time.

At both ends of the seal tube 12 are embedded clamping rings 30 and 32 between the rubber sleeve layer 26 and the rubber cover layer 28. The base members 14 and 16 are secured to the seal tube 12 by clamping the clamping rings 30 and 32 to the base members 14 and 16, respectively, inserted into the seal tube 12.

Figure 2A:
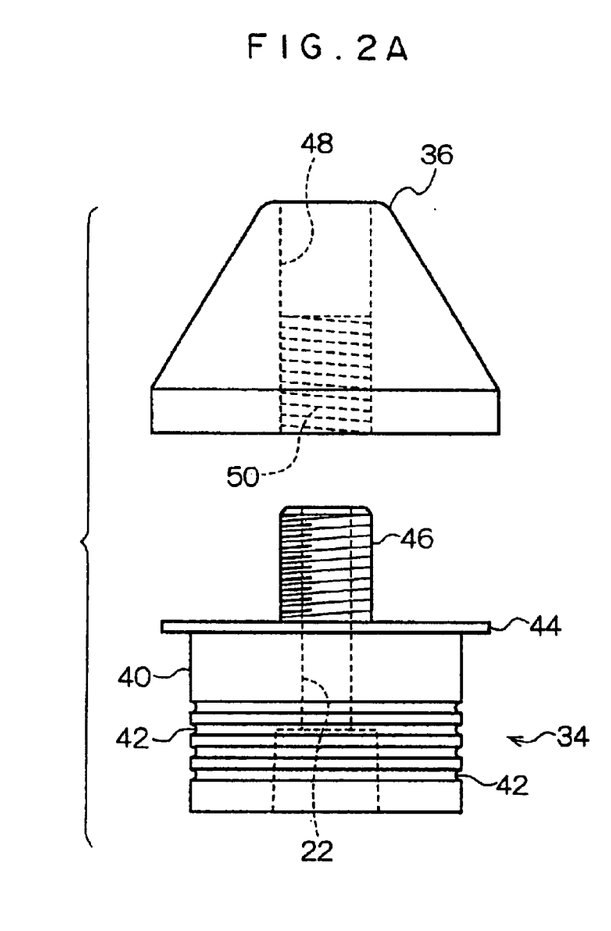
FIGS. 2A and 2B are side views showing a base member of a fore end side of the seal device shown in FIG. 1.
Figure 2B:
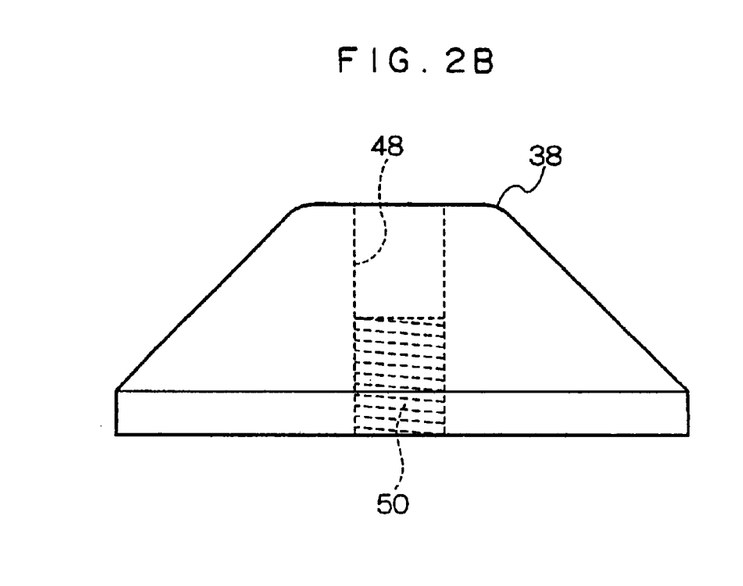

As shown in FIGS. 2A and 2B, the base member 14 includes a base member body 34 formed into a substantially columnar shape and a guide 36 or 38 formed into a substantially truncated cone at the fore end thereof. In the base member body 34, there is provided an inserted portion 40 to be inserted into the seal tube 12. At the outer periphery of the inserted portion 40 are formed grooves 42 extending in a circumferential direction. The clamping ring 30 in the seal tube 12 clamps a portion including the plurality of grooves 42 formed at the inserted portion 40. Consequently, fastening force between the seal tube 12 and the base member 14 becomes sufficiently great. Incidentally, roughening treatment can produce a similar effect in place of the formation of the plurality of grooves 42 at the outer periphery of the inserted portion 40.

In the base member body 34, a flange 44 extending from the outer end of the inserted portion 40 toward the outer periphery is formed, and further, a pipe-like external thread 46 projecting from the end surface at the tip is formed integrally. The inner circumferential of the external thread 46 communicates with the through hole 22 penetrating the base member body 34. In the meantime, at the guide 36 or 38 is bored a center hole 48 penetrating the central portion of the guide 36 or 38. At the inner circumferential surface of the center hole 48 is formed an internal thread 50 corresponding to the external thread 46. As a consequence, the external thread 46 at the base member body 34 is screwed into the internal thread 50 at either one of the guides 36 and 38, so that the base member body 34 is connected to either one of the guides 36 and 38, thereby constituting the base member 14.

Each of the guides 36 and 38 is formed into a tapered shape such that the outer diameter is gradually increased from the tip toward the base end on the side of the seal tube 12. The guides 36 and 38 are different in outer diameter at the base end thereof from each other. Specifically, in the present embodiment, the outer diameter of the guide 36 is 32 mm; in contrast, the outer diameter of the guide 38 is 50 mm. Here, an operator selects a proper one out of the two guides 36 and 38 according to the inner diameter of the fluid passage such as a tubular member, for example, before the seal tube 12 is inserted into the fluid passage such as a tubular member, and thus, the selected guide 36 is connected to the base member body 34, thereby constituting the base member 14. Consequently, the seal tube 12 can be smoothly inserted into the fluid passage such as a tubular member, and further, the seal tube 12 can be prevented from being erroneously inserted into a branch pipe of a small diameter from a main pipe of a large diameter.

Figure 3:
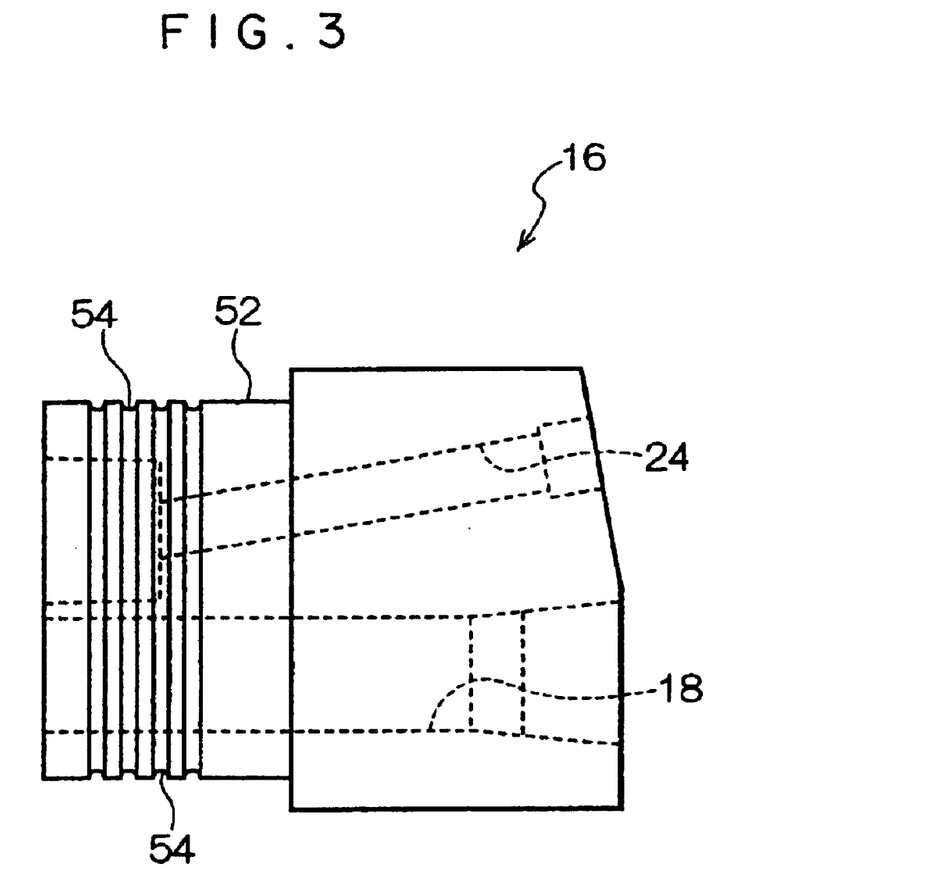
FIG. 3 is a side view showing the base member of a rear end side of the seal device shown in FIG. 1.

The base member 16 at the rear end is formed into a substantially columnar shape, as shown in FIG. 3, and is provided at one end thereof with an inserted portion 52 to be inserted into the seal tube 12. Also at the outer periphery of the inserted portion 52 are formed a plurality of grooves 54 extending in a circumferential direction, like the inserted portion 40 in the base member 14. A portion including the grooves 54 at the inserted portion 52 also is clamped by the clamping ring 32 of the seal tube 12. Consequently, fastening force between the seal tube 12 and the base member 16 becomes sufficiently large. Incidentally, roughening treatment can produce a similar effect in place of the formation of the plurality of grooves 54 at the outer periphery of the inserted portion 52.

As shown in FIG. 1, the rear end of the discharge pipe 20 is connected via a nipple 58 to one end of the through hole 24 formed through the base member 16 inside of the seal tube 12. Furthermore, to the other end of the through hole 24 is connected an extending pipe 62 via a nipple 60 from the outside of the seal tube 12. To the tip of the extending pipe 62 is connected an exhaust valve 64 for opening or closing the discharge pipe 20. The exhaust valve 64 is subjected to a predetermined opening operation, and thus, is opened to allow the inside of the discharge pipe 20 to communicate. In contrast, the exhaust valve 64 is subjected to a predetermined closing operation, and thus, is closed to allow the inside of the discharge pipe 20 to be closed. The tip of the discharge pipe 20 is connected via a one-touch coupling 66 to one end of the through hole 22 (see FIG. 2A) formed through the base member 14 inside of the seal tube 12.

To the fluid injection passage 18 of the base member 16 is connected a plug 68 constituting a part of the one-touch coupling via a nipple 70 from the outside of the seal tube 12. To the plug 68 can be connected a socket 88 of a fluid supplier 80 (see FIG. 4), described later, constituting another part of the one-touch coupling. The plug 68 contains a check valve, not shown. The check valve is opened only at the time of the connection of the socket 88 in the fluid supplier 80, and is closed simultaneously when the socket 88 is detached from the plug 68. As a consequence, at the time of the detachment of the socket 88, the fluid (i.e., the gaseous nitrogen) injected into the seal tube 12 can be inhibited from leaking to the outside through the plug 68.

Figure 4:
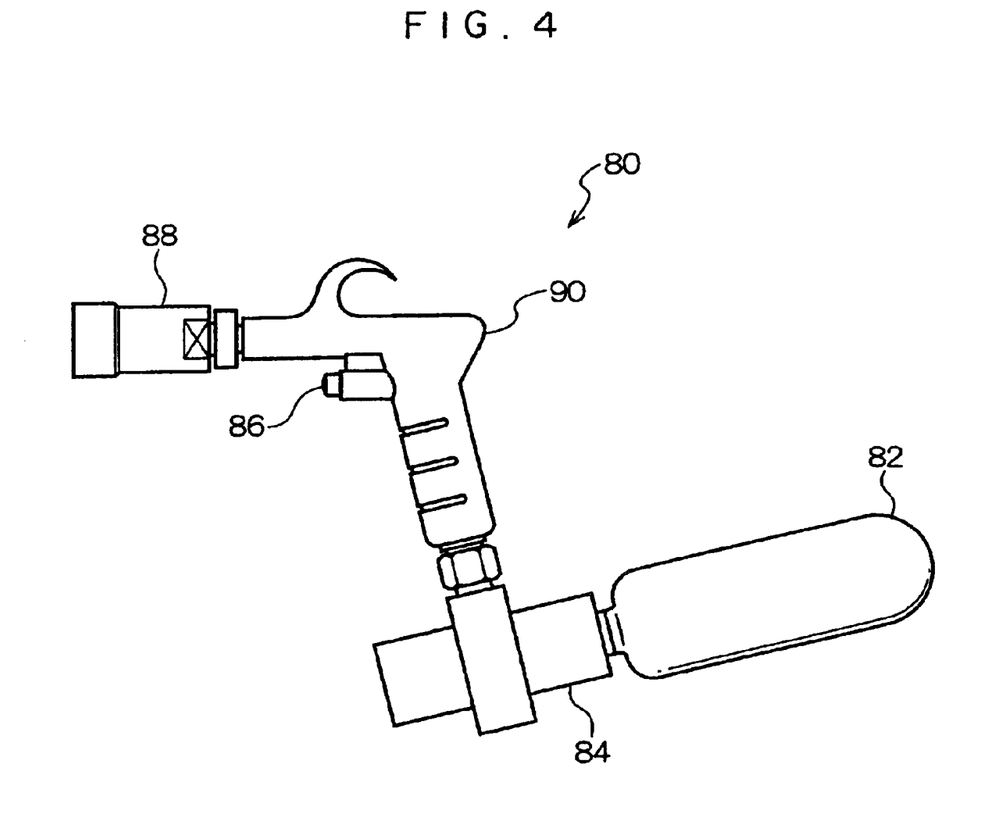
FIG. 4 is a side view showing the configuration of a fluid supplier, which is used in the seal device for a tubular member or the like of the invention.

FIG. 4 shows the fluid supplier 80 for injecting the gaseous nitrogen into the seal tube 12. The fluid supplier 80 is provided with a gas cylinder 82 filled with the gaseous nitrogen and a pressure reducing valve 84 fixed to the gas cylinder 82. The pressure reducing valve 84 is connected to a main body 90 containing a switch valve and an exhaust valve, neither shown, and having a push lock switch 86 and the socket 88. In the fluid supplier 80, the socket 88 is fitted to the plug 68, before the push lock switch 86 is pushed once, so that the switch valve contained in the main body 90 is released. Consequently, the gaseous nitrogen filled in the gas cylinder 82 is injected into the seal tube 12 through the pressure reducing valve 84. In contrast, when the gaseous nitrogen is degassed from the seal tube 12, the socket 88 is fitted to the plug 68, before the push lock switch 86 is pushed once more, so that the exhaust valve contained in the main body 90 is released. Therefore, the gaseous nitrogen staying inside of the seal tube 12 can be exhausted to the outside through the exhaust valve 64.

As shown in FIG. 1, a connecting ring 96 is securely held between a pair of nuts 92 and 94 for securely connecting the plug 68 to the base member 16 via the nipple 70. Around the connecting ring 96 is secured a locking ring 98. Moreover, in the seal device 10, there is provided a wire rope 100 having shackles 102 securely connected at both ends thereof. One of the shackles 102 of the wire rope 100 can be connected to or dis-connected from the locking ring 98 of the connecting ring 96. Consequently, the wire rope 100 extends to the outside of the fluid passage such as a tubular member in the state in which the seal tube 12 is inserted into the fluid passage such as a tubular member by connecting the wire rope 100 to the connecting ring 96. In this manner, an operator grips the other shackle 102 of the wire rope 100 so as to apply pulling force after the completion of sealing work with respect to the fluid passage such as a tubular member, and thus, the operator can easily pull the seal tube 12 to the outside from the fluid passage such as a tubular member. As a result, workability becomes excellent in pulling the seal tube 12. Furthermore, excessive force cannot be applied to the seal device 10, thereby preventing damage to the device.

Figure 5:
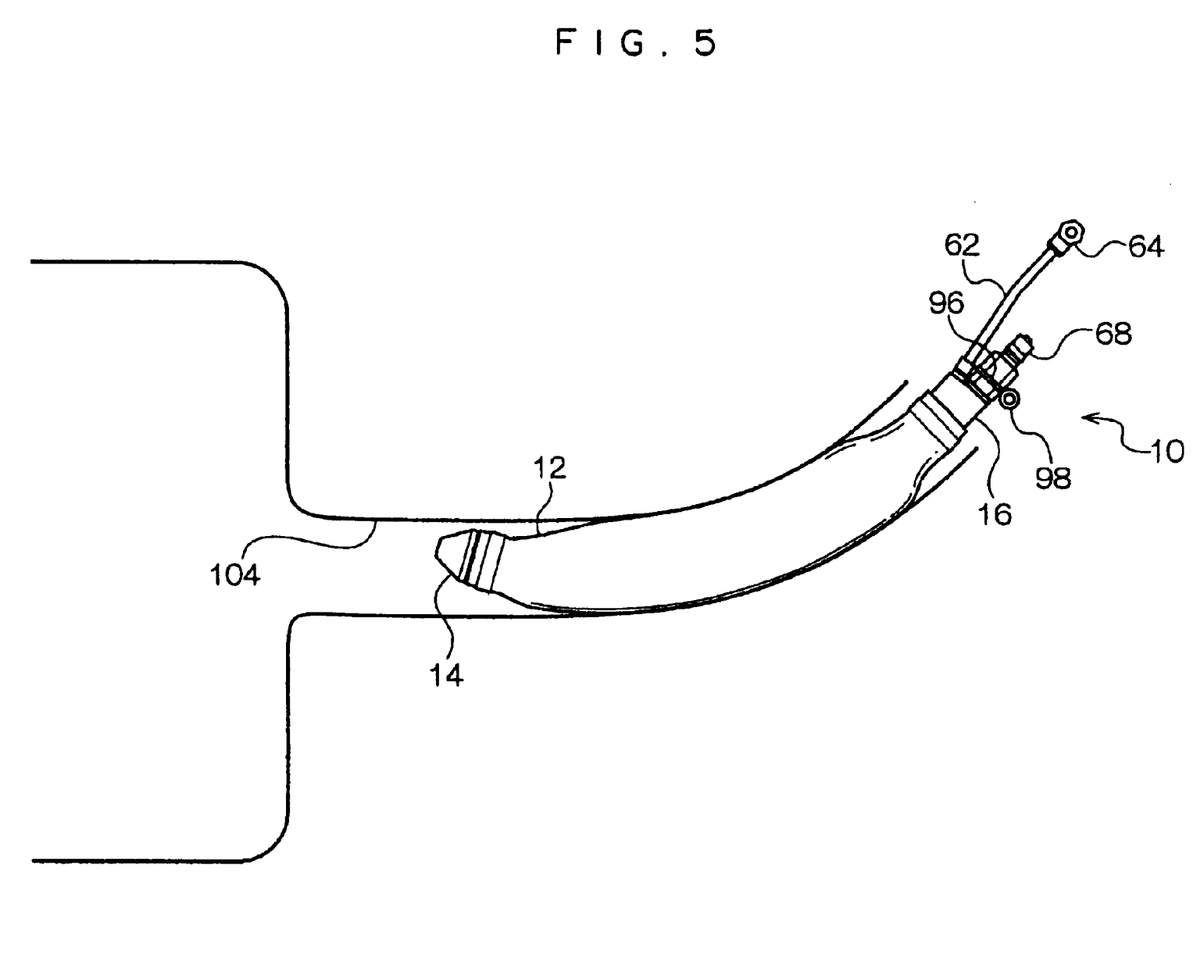
FIG. 5 is a side view showing a state in which a fluid passage such as a tubular member is sealed by the seal device shown in FIG. 1.

Explanation will be made on a method for sealing a fluid passage 104 such as a tubular member, as shown in FIG. 5, by the seal device 10 such configured as described above. First, the socket 88 of the fluid supplier 80 is fitted to the plug 68 on the side of the seal tube 12 outside of the fluid passage 104, and then, the gaseous nitrogen is injected (preliminary injected) in a quantity enough to hardly generate expansion inside of the seal tube 12, which is then inserted into the fluid passage 104 from the side of the base member 14. In this state, when the seal tube 12 is expanded by injecting the gaseous nitrogen into the seal tube 12 by the fluid supplier 80, an intermediate portion of the seal tube 12 along a longitudinal direction is press-fitted to the inner surface of the fluid passage 104 over the entire circumference, as shown in FIG. 5, and thus, the fluid passage 104 can be sealed.

Moreover, when the exhaust valve 64 is released in the state in which the fluid passage 104 is sealed by the seal tube 12, as described above, a fluid pressure inside of the fluid passage 104 can be relieved to the outside through the discharge pipe 20 and the exhaust valve 64. In this way, an increase in pressure inside of the fluid passage 104 can be suppressed, as required, while the fluid passage 104 is sealed by the seal tube 12. As a result, the fluid passage 104 per se can be prevented from being broken due to the increase in pressure inside of the fluid passage 104 sealed by the seal tube 12, and further, the seal tube 12 can be prevented from blowing through the inside of the fluid passage 104.

(Second Embodiment)

Figure 6:
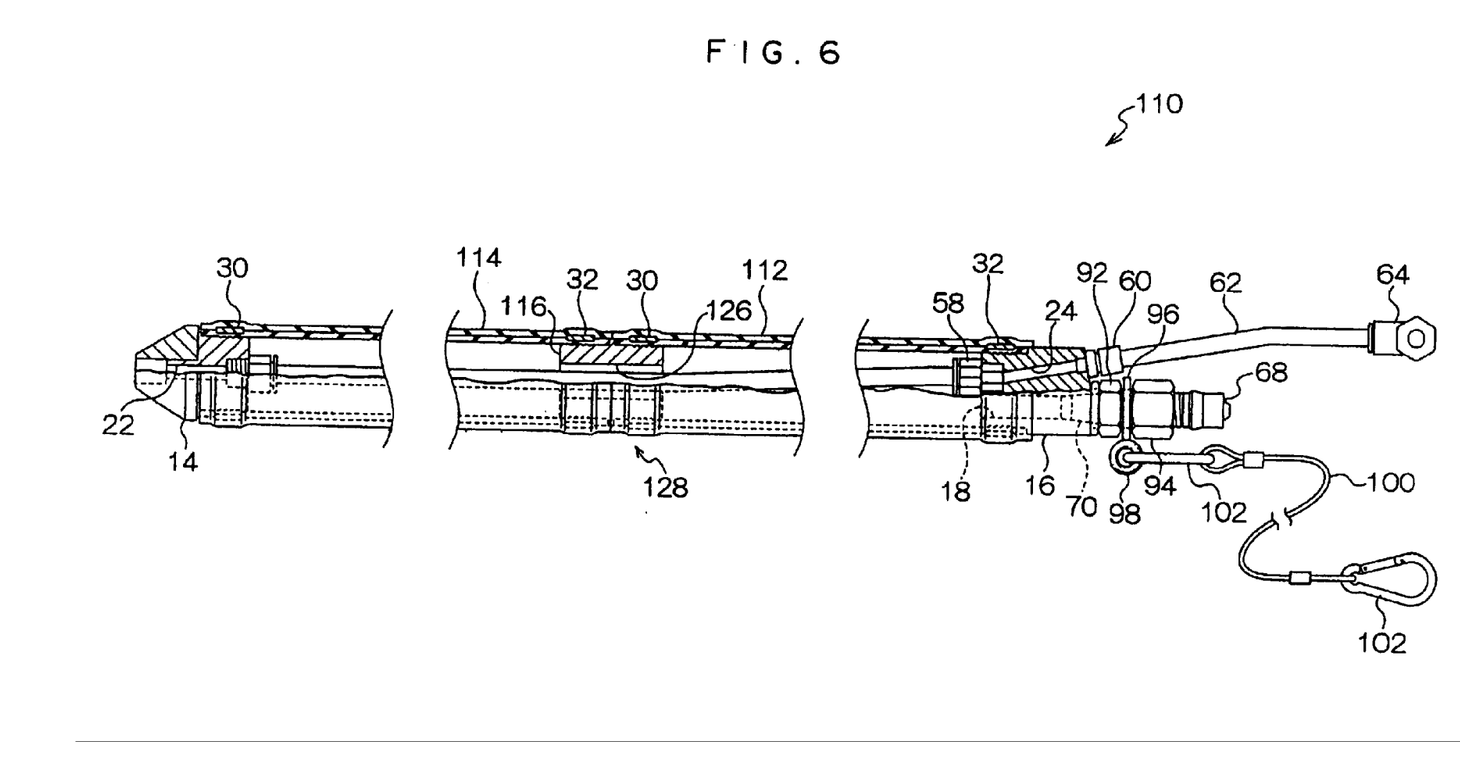
FIG. 6 is a side cross-sectional view showing the configuration of a seal device for a tubular member or the like in a second embodiment of the invention.

FIG. 6 shows a seal device in a second embodiment of the invention. Here, constituent elements having the same configuration and function in the seal device in the second embodiment of the invention as those in the seal device 10 in the first embodiment are designated at the same reference numerals, and therefore, their explanations will be omitted below.

Figure 8:
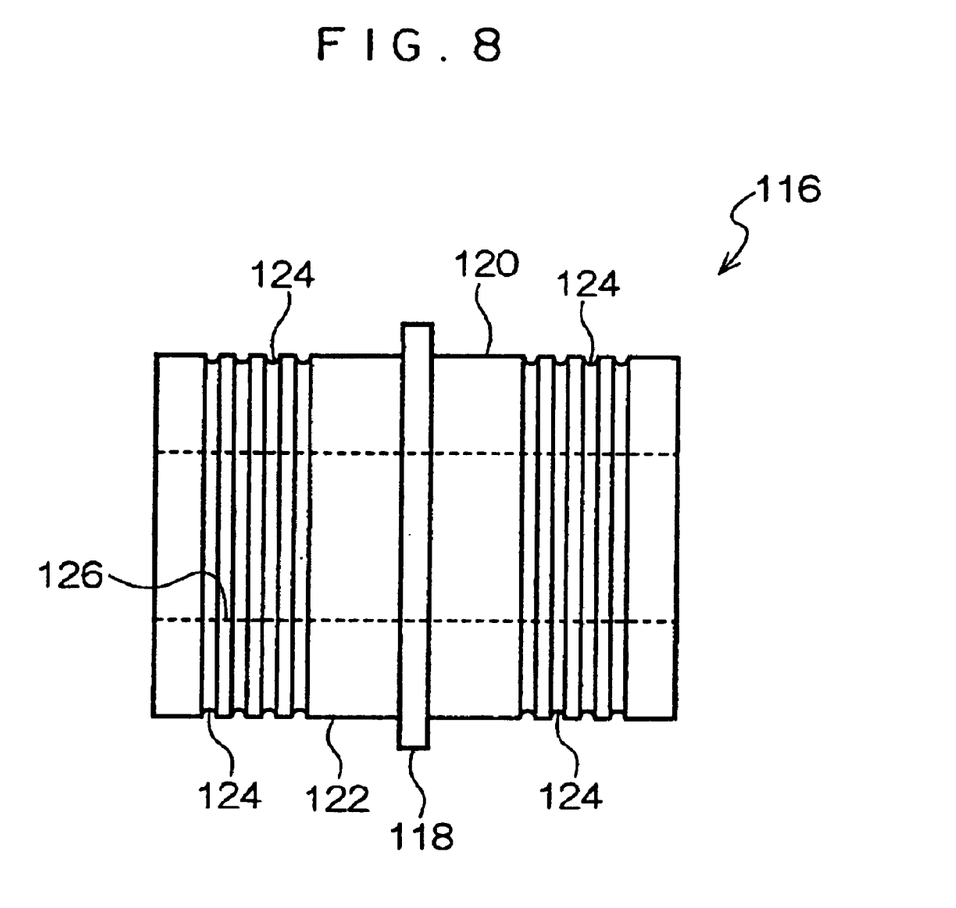
FIG. 8 is a side view showing the connecting base member in the connected-tube body shown in FIG. 6.

A seal device 110 in the present embodiment is provided with two seal tubes 112 and 114 and a connecting base member 116 for connecting these seal tubes 112 and 114 to each other. Here, each of the seal tubes 112 and 114 basically has the same configuration as that of the seal tube 12 in the first embodiment. The connecting base member 116 is formed into a substantially columnar shape, as shown in FIG. 8, and a ring-like flange 118 extending toward the outer periphery is integrally formed at the intermediate portion thereof in an axial direction. In the connecting base member 116, there are provided inserted portions 120 and 122 having substantially the same outer diameter on both sides of the flange 118. A plurality of grooves 124 extending in a circumferential direction are formed at the outer periphery of each of the inserted portions 120 and 122.

Figure 7:
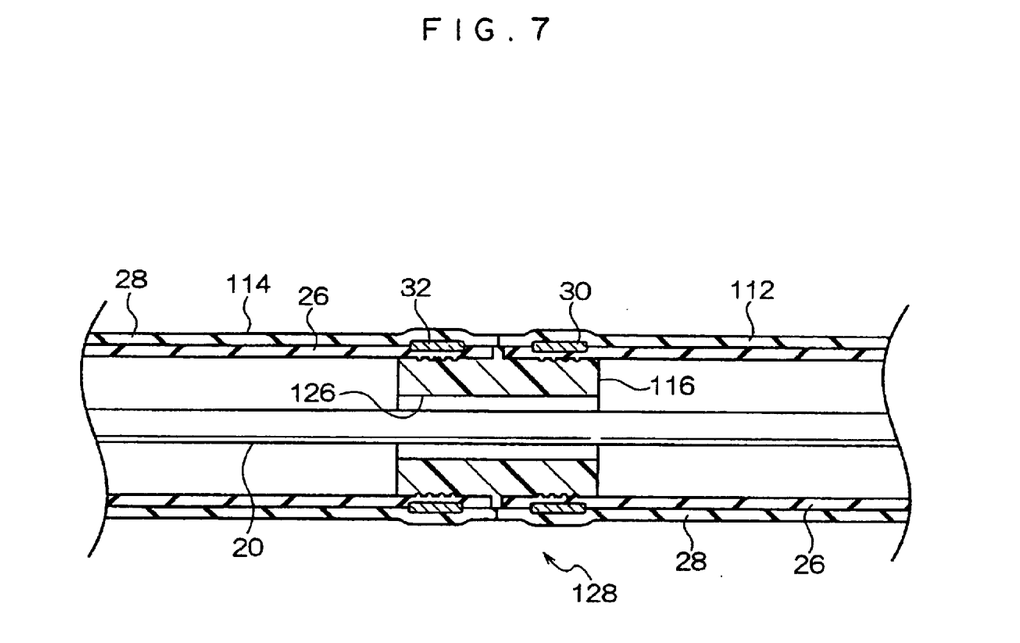
FIG. 7 is a side cross-sectional view showing a connected portion between two seal tubes connected via a connecting base member in a connected-tube body shown in FIG. 6.

As shown in FIG. 7, one inserted portion 120 in the connecting base member 116 is inserted into the seal tube 112 from the fore end of the seal tube 112, and then, a portion including the grooves 124 is clamped by a clamping ring 30 embedded in the seal tube 112, to be thus fixed to the seal tube 112. The other inserted portion 122 is inserted into the seal tube 114 from the rear end of the seal tube 114, and then, is clamped by a clamping ring 32 embedded in the seal tube 114, to be thus fixed to the seal tube 114. In this manner, the two seal tubes 112 and 114 are connected to each other via the connecting base member 116, thereby constituting a connected-tube body 128. At the connecting base member 116 is formed a communication path 126 penetrating in the longitudinal direction of the seal tubes 112 and 114. The communication path 126 is adapted to allow the two seal tubes 112 and 114 to communicate with each other. A discharge pipe 20 connected to a through hole 24 formed at a base member 16 extends from the seal tube 112 to the seal tube 114 through the communication path 126, and the tip is connected to a through hole 22 formed at a base member 14, as shown in FIG. 6.

Figure 9:
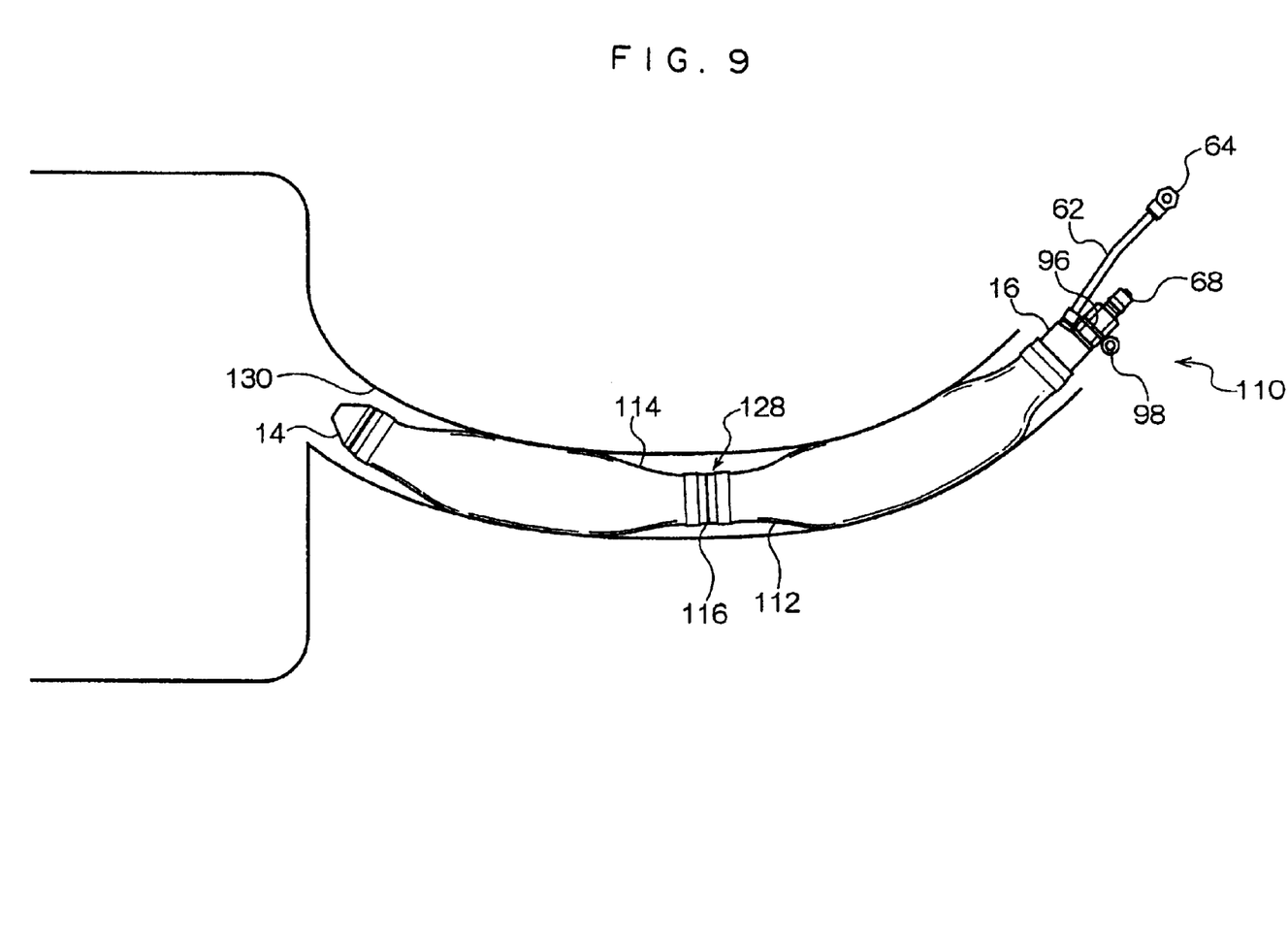
FIG. 9 is a side view showing a state in which a fluid passage such as a tubular member is sealed by the seal device shown in FIG. 6.

Explanation will be made on a method for sealing a fluid passage 130 such as a tubular member, as shown in FIG. 9, by the seal device 110 such configured as described above. First, a socket 88 of a fluid supplier 80, as shown in FIG. 4, is fitted to a plug 68 on the side of the connected-tube body 128 outside of the fluid passage 130, and then, gaseous nitrogen is injected (preliminary injected) in a quantity enough to hardly generate expansion inside of the seal tubes 112 and 114, and then, the connected-tube body 128 is inserted into the fluid passage 130 from the side of the base member 14. In this state, when the seal tubes 112 and 114 are expanded by injecting the gaseous nitrogen into the seal tubes 112 and 114 by the fluid supplier 80, intermediate portions of the seal tubes 112 and 114 along a longitudinal direction are press-fitted to the inner surface of the fluid passage 130 over the entire circumference, as shown in FIG. 9, and thus, the fluid passage 130 can be sealed. At this time, since the two seal tubes 112 and 114 can be easily bent and curved from a starting point in the vicinity of the connecting base member 116 in the connected-tube body 128 even if the fluid passage 130 is curved, as shown in FIG. 9, the connected-tube body 128 can be easily curved along the fluid passage 130 at the time of the insertion into the fluid passage 130. As a result, it is possible to facilitate the insertion work of the seal tubes 112 and 114 into the fluid passage 130, and further, to enhance the sealing property of the seal tubes 112 and 114 with respect to the curved fluid passage 130.

Moreover, when an exhaust valve 64 is released in the state in which the fluid passage 130 is sealed by the connected-tube body 128 (i.e., the seal tubes 112 and 114), a fluid pressure inside of the fluid passage 130 can be relieved to the outside through a discharge pipe 20 and the exhaust valve 64 in the same manner as in the seal device 10 in the first embodiment.

In the above-described seal device 110 in the embodiment, the seal tubes 112 and 114 can be expanded toward the outer periphery, by injecting the gaseous nitrogen into the two seal tubes 112 and 114 constituting the connected-tube body 128. Therefore, when the connected-tube body 128 is inserted into the fluid passage 130 from the side of the base member 14 and the gaseous nitrogen is injected into the seal tubes 112 and 114 from the outside of the fluid passage 130, the inside of the fluid passage 130 can be sealed by the expanded seal tubes 112 and 114.

At this time, since the two seal tubes 112 and 114 constituting the connected-tube body 128 are press-fitted to the inner surface of the fluid passage 130 around the centers thereof at a maximum pressure corresponding to an inner pressure, the press-fitting force exerting at the inner surface of the fluid passage 130 can be increased by the connected-tube body 128 as a whole and an area of a portion press-fitted to the inner surface of the fluid passage 130 at the maximum pressure can be increased in comparison with the case where the inside of the fluid passage 130 is sealed by expanding only one seal tube inside of the fluid passage 130. Thus, it is possible to seal the inside of the fluid passage 130 against a high pressure, and further, to enhance the sealing property with respect to the fluid passage 130.

Although the connected-tube body 128 is configured by connecting the two seal tubes 112 and 114 via the single connecting base member 116 in the seal device 110 in the embodiment, three or more seal tubes may be connected to each other via the connecting base members 116, thereby constituting the connected-tube body. At this time, the connected-tube body can be easily curved and bent by reducing the entire length of each of the seal tubes constituting the connected-tube body in comparison with the case where each of the seal tubes is long, so that the connected-tube body can be easily inserted into the fluid passage having a smaller radius of curvature, and further, the sealing property can be enhanced.

Figure 10:
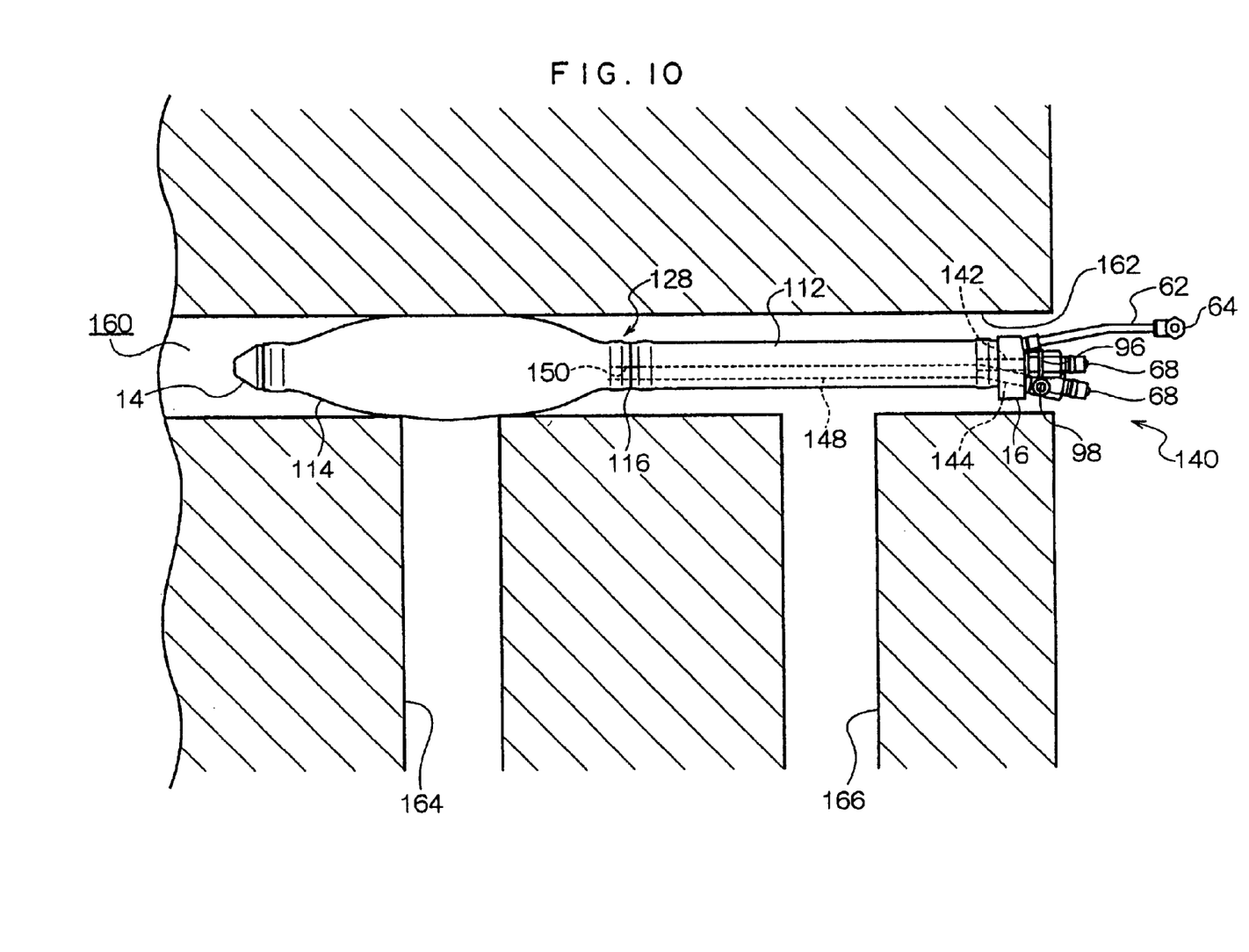
FIG. 10 is a side cross-sectional view showing the configuration of a seal device for a tubular member or the like in a modification of the second embodiment of the invention.

FIG. 10 shows a seal device in a modification of the second embodiment of the invention. In a seal device 140, two seal tubes 112 and 114 connected to each other via a connecting base member 116 are divided in a state tightly sealed from each other. At a base member 16 are bored two through holes 142 and 144, to which plugs 68 are connected. One of the plugs 68 communicates with the inside of the seal tube 112 via one through hole 142. The other plug 68 is connected to the other through hole 144. To the through hole 144 is connected an injection pipe 148 via a nipple, not shown, inside of the seal tube 112. The injection pipe 148 is connected to a through hole 150 penetrating the connecting base member 116 via a nipple, not shown, through the inside of the seal tube 112. Consequently, the other plug 68 communicates with the inside of the seal tube 114 via the injection pipe 148.

Explanation will be made on a method for sealing a fluid passage 160 such as a tubular member, as shown in FIG. 10, by the seal device 140 such configured as described above. Here, in the fluid passage 160 such as a tubular member, there are provided two branch pipes 164 and 166 branched from a main pipe 162.

First, a socket 88 of a fluid supplier 80, as shown in FIG. 4, is fitted to the two plugs 68 on the side of a connected-tube body 128 outside of the fluid passage 160, and then, gaseous nitrogen is injected (preliminary injected) in a quantity enough to hardly generate expansion inside of the seal tubes 112 and 114. Thereafter, the connected-tube body 128 is inserted into the main pipe 162 in the fluid passage 160 from the side of the base member 14. In this state, when the seal tube 114 is expanded by injecting the gaseous nitrogen into only the seal tube 114 at the fore end by the fluid supplier 80, an intermediate portion of the seal tube 114 along a longitudinal direction is press-fitted to the inner surface of the main pipe 162 of the fluid passage 160 over the entire circumference, as shown in FIG. 10, and further, is press-fitted also to an opening peripheral edge of the branch pipe 164 in the main pipe 162, and thus, the main pipe 162 of the fluid passage 160 and one branch pipe 164 can be sealed. In contrast, the main pipe 162 of the fluid passage 160 and the other branch pipe 166 can be sealed by the seal tube 112 by injecting the gaseous nitrogen into only the seal tube 112 at the rear end. Moreover, the main pipe 162 of the fluid passage 160 and the branch pipes 164 and 166 can be sealed by the seal tubes 112 and 114, by injecting the gaseous nitrogen into both of the seal tubes 112 and 114.

Incidentally, although the connected-tube body 128 is configured by connecting the two seal tubes 112 and 114 to each other via the single connecting base member 116 in the seal device 140 shown in FIG. 10, the connected-tube body may be configured by connecting three or more seal tubes via the connecting base members 116, so as to selectively supply the gaseous nitrogen to each of seal tubes.

In addition, in the above-described seal devices 10, 110 and 140 of the invention, the gaseous nitrogen is used as the fluid to be injected into the seal tubes 12, 112 and 114. This is because the gaseous nitrogen has low chemical activity and small volumetric change according to a change in temperature in comparison with other gas such as carbon dioxide or air, thereby making it difficult to generate leakage of gas from the seal tubes 12, 112 and 114 for a long period of time, and further, because the gaseous nitrogen is inexpensive in comparison with inactive gas such as helium.

What is claimed is:

1. A seal device for a tubular member provided with a single cylindrical seal tube to be inserted into a passage such as a tubular member, in which the seal tube is expanded toward an outer periphery by injecting a fluid into the seal tube, for use in sealing an inside of the passage such as a tubular member, the seal device for a tubular member comprising:

the seal tube having openings at a fore end and a rear end thereof;

first and second base members to be inserted to the fore end and the rear end of the seal tube, so as to tightly seal an inside of the seal tube;

a fluid injection passage disposed in such a manner as to communicate with the inside of the seal tube through the second base member;

a discharge pipe inserted through the seal tube and communicating with an outside of the seal tube through the first and second base members; and a switch valve for opening and closing the discharge pipe;

wherein the first base member has a guide, the guide being formed into a tapered shaped projecting from a tip of the seal tube and gradually increasing in outer diameter from a tip portion of the guide toward a base end portion of the guide at a seal tube side thereof and being configured so as to be replaced, whereby the guide can be replaced with another guide having a maximum outer diameter according to an inner diameter of the fluid passage such as a tubular member.

2. A seal device for a tubular member according to claim 1, wherein the seal tube includes a cylindrical rubber sleeve layer, and a cylindrical rubber cover layer laminated on an outer periphery of the rubber sleeve layer and covering the outer periphery of the rubber sleeve layer.

3. A seal device for a tubular member according to claim 1, further including a pulling member detachably connected to the second base member and extending outside of the fluid passage in a state in which the seal tube is inserted into the fluid passage such as a tubular member, wherein the seal tube can be pulled out from the fluid passage such as a tubular member with the application of pulling force to the pulling member.

4. A seal device for a tubular member according to claim 1, wherein the fluid to be injected into the seal tube is gaseous nitrogen.

5. A seal device for a tubular member provided with a plurality of cylindrical seal tubes to be inserted into a passage such as a tubular member, in which the seal tubes are expanded toward an outer periphery by injecting a fluid into the seal tubes, for use in sealing an inside of the passage such as a tubular member, the seal device for a tubular member comprising:

the plurality of seal tubes, which can be elastically expanded toward the outer periphery, having openings at fore ends and rear ends thereof;

at least one connecting base member, by which a fore end of one of the seal tubes is connected to a rear end of another of the seal tubes, so as to configure a connected-tube body;

at least one communication path formed at the at least one connecting base member and allowing the plurality of seal tubes constituting the connected-tube body to communicate with each other;

first and second base members inserted to a fore end and a rear end of the connected-tube body, so as to tightly seal an inside of the connected-tube body; and a fluid injection passage disposed in such a manner as to communicate with insides of the plurality of seal tubes constituting the connected-tube body, through the second base member; and further including:

a discharge pipe inserted through the connected-tube body and communicating with an outside of the connected-tube body through the first and second base members; and a switch valve for opening and closing the discharge pipe.

6. A seal device for a tubular member according to claim 5, wherein the plurality of seal tube includes a cylindrical rubber sleeve layer, and a cylindrical rubber cover layer laminated on an outer periphery of the rubber sleeve layer and covering the outer periphery of the rubber sleeve layer.

7. A seal device for a tubular member according to claim 5, wherein the first base member has a guide, the guide being formed into a tapered shape projecting from a tip of one of the seal tubes and gradually increasing in outer diameter from a tip portion of the guide toward a base end portion of the guide at a seal tube side thereof and being configured so as to be replaceable, whereby the guide can be replaced with another guide having a maximum outer diameter according to an inner diameter of the fluid passage such as a tubular member.

8. A seal device for a tubular member according to claim 5, further including a pulling member detachably connected to the second base member and extending outside of the fluid passage in a state in which the plurality of seal tubes are inserted into the fluid passage such as a tubular member, wherein the seal tube can be pulled out from the fluid passage such as a tubular member with the application of pulling force to the pulling member.

9. A seal device for a tubular member according to claim 5, wherein the fluid to be injected into the seal tube is gaseous nitrogen.

10. A seal device for a tubular member provided with a plurality of cylindrical seal tubes to be inserted into a passage such as a tubular member, in which each of the seal tubes is expanded toward an outer periphery by injecting a fluid into each of the seal tubes, for use in sealing an inside of the passage such as a tubular member, the seal device for the tubular member comprising:

the plurality of seal tubes, which can be elastically expanded toward the outer periphery, having openings at fore ends and rear ends thereof;

at least one connecting base member, by which a fore end of one of the seal tubes is connected to a rear end of another of the seal tubes, so as to configure a connected-tube body, the at least one connecting base member dividing the connected seal tubes such that each of the seal tubes is in a tightly sealed state;

first and second base members inserted to a fore end and a rear end of the connected-tube body, so as to tightly seal tubes respectively constituting the fore end and the rear end of the connected-tube body; and a plurality of fluid injection passages disposed in such a manner as to communicate independently with insides of the plurality of seal tubes constituting the connected-tube body, through the second base member and the at least one connecting base member.

11. A seal device for a tubular member according to claim 10, including:

a discharge pipe inserted through the connected-tube body and communicating with an outside of the connected-tube body through the first and second base members; and a switch valve for opening and closing the discharge pipe.

12. A seal device for a tubular member according to claim 10, wherein the plurality of seal tubes includes a cylindrical rubber sleeve layer, and a cylindrical rubber cover layer laminated on an outer periphery of the rubber sleeve layer and covering the outer periphery of the rubber sleeve layer.

13. A seal device for a tubular member according to claim 10, wherein the first base member has a guide, the guide being formed into a tapered shape projecting from a tip of one of the seal tubes and gradually enlarging in outer diameter from a tip portion of the guide toward a base end portion of the guide at the seal tube side thereof and being configured so as to be replaceable, whereby the guide can be replaced with another guide having a maximum outer diameter according to an inner diameter of the fluid passage such as a tubular member.

14. A seal device for a tubular member according to claim 10, further including a pulling member detachably connected to the second base member and extending outside of the fluid passage in a state in which the plurality of seal tubes are inserted into the fluid passage such as a tubular member, wherein the seal tube can be pulled out from the fluid passage such as a tubular member with the application of pulling force to the pulling member.

15. A seal device for a tubular member according to claim 10, wherein the fluid to be injected into the seal tube is gaseous nitrogen.

* * * * *